United States Patent Office 3,508,953
Patented Apr. 28, 1970

3,508,953
HYDROPHILIC POLYURETHANE SPONGE
John G. Simon and Jon P. McGurran, St. Paul, Minn., assignors to Minnesota Mining and Manufacturing Company, St. Paul, Minn., a corporation of Delaware
No Drawing. Filed Dec. 22, 1967, Ser. No. 692,709
Int. Cl. B05c; B44d 1/02; C23c
U.S. Cl. 117—98                        7 Claims

ABSTRACT OF THE DISCLOSURE

Polyurethane sponges are rendered hydrophilic by immersing them in an aqueous suspension of clay from the montmorillonite group, squeezing out the excess, and, if desired, drying the sponge. The hydrophilic properties are retained for an extremely long period of time.

BACKGROUND OF THE INVENTION

The invention relates to novel hydrophilic polyurethane sponges and to simple, inexpensive methods of making normally hydrophobic polyurethane sponges hydrophilic.

Regenerated cellulose sponges, which are inexpensive and extremely hydrophilic, are by far the most common sponges for household and other cleaning uses. Such sponges, however, are subject to attack by mildew and inclined to become sour smelling unless they are rinsed with extreme care after use. Additionally, no practical way has been found to permanently plasticize regenerated cellulous sponges, as the result of which they shrink greatly when dry and become almost board-like. Shrinkage and expansion severely distort such sponges, particularly where one face is laminated to some other element, e.g., the metal base plate of a mop head or a low density abrasive pad of the type shown in Hoover et al. Patent 2,958,593. Despite these obvious disadvantages, however, no really effective replacement has heretofore been known for cellulose sponges.

Open-cell polyurethane sponges have been known for many years, their softness, appearance, lightness, mildew-resistance, availability and other features making them logical candidates to replace the traditional cellulose sponge. The one feature polyurethane sponges typically lack, however, is the ability to absorb water—a drawback which offsets their other desirable characteristics. Understandably, the prior art reflects a great deal of work designed to correct this deficiency.

Polyurethane sponges have been reportedly rendered hydrophilic by treatment with acid, alkali, oxidizing agents, etc., thereby degrading the cell walls. Such processes are not only inconvenient, but also result in sponges having greatly decreased strength and life.

Others have attempted to associate polyurethane sponges with more hydrophilic materials, e.g., by forming polyurehtane foam on a cellulose sponge or vice versa, incorporating cellulose derivatives either in or on polyurethane foam, etc. These systems have likewise been expensive, ineffective, erratic and/or changed the desirable "feel" of polyurethane sponge.

Perhaps the most effective technique heretofore available for rendering a polyurethane sponge hydrophilic is set forth in U.S. Patent No. 3,224,899 which also details other prior art procedures. The patentee acidifies an aqueous slurry of finely divided silica, immerses a polyurethane sponge therein, rinses the sponge in water to remove the excess acid, and dries. The patentee concedes the existence of corrosion problems, and the strong acid solutions used obviously pose handling problems for factory personnel. Although normally hydrophobic polyurethane sponges are rendered hydrophilc by this method, this quality is not nearly so permanent as is desirable. As a result, the treated sponges lose their hydrophilic properties long before they have worn out mechanically, to the considerable annoyance of the user.

SUMMARY

The present invention provides a polyurethane sponge which not only has been rendered hydrophilic without being weakened mechanically, but also maintains this wettable character throughout its useful life. The sponge is prepared by simple, rapid, and inexpensive treatment, employs commonly available and almost literally "dirt-cheap" raw materials which are biologically inactive, requires no unusual equipment or careful handling, and presents no problem of corrosion of equipment or skin irritation to personnel.

In accordance with the invention, a conventional flexible polyurethane sponge prepared in any manner well known to the art, is immersed in a dilute aqueous slurry of clay essentially containing crystalline clay from the montmorillonite group, the excess slurry squeezed out, and the thus-treated sponge dried. The pH of the slurry is not critical, and, in fact, it is preferred to use ordinary tap water. No rinsing of the treated sponge is required. Sponges subjected to water absorption and expression without losing their hydrophilic character. Even after being alternately immersed in water and passed through rubber wringer rolls set with negative clearance for several hundred cycles, the treated sponges readily sink when placed in water and retain the ability to quickly blot up a puddle of water from a surface. The useful life of these novel sponges has been found to be approximately an order of magnitude greater than that of the silica-treated sponges described in the aforesaid U.S. Patent 3,224,899.

Clays are sediments or sedimentary rock particles having a diameter of 4 microns or smaller, with particles smaller than 2 microns predominating. Clays are usually composed of hydrosilicates of aluminum, iron, or magnesium, which are commonly plate like (and less commonly lath-like, tubular, or scroll-shape), typically of colloidal size in at least one dimension. Clays are commonly classified into an amorphous group and several crystalline groups, the exact number of which varies somewhat with the worker in the field. As might be expected, several groups of clays often occur in combination at any given site.

The commonly recognized montmorillonite group of clays includes, among others, the following species, reported as having the typical formula indicated: montmorillonite, $[Al_{1.67}Mg_{0.33}(Na_{0.33})]Si_4O_{10}(OH)_2$; beidellite, $Al_{2.17}[Al_{0.33}(Na_{0.33})Si_{3.17}O_{10}(OH)_2]$; nontronite, $Fe(III)_2[Al_{0.8}(Na_{0.33})Si_{3.67}]O_{10}(OH)_2$;

hectorite, $[Mg_{2.67}Li_{0.33}(Na_{0.33})]Si_4O_{10}(OH, F)_2$; and saponite, and $Mg_{3.00}[Al_{0.33}[Na_{0.33})Si_{3.67}]O_{10}(OH)_2$. The structure forms a 3-layer (two tetrahedral and one octahedral) sandwich. Montmorillonites are derived structurally from pyrophyllite, $Si_8Al_4O_{20}(OH)_4$, or talc, $Si_8Mg_6O_{20}(OH)_4$, by substitutions mainly in the octahedral layer. The montmorillonite species is well known as the main component of bentonite clays.

In general, the $Na_{0.33}$ in montmorillonite group clays is exchangeable, and the lattice structure is frequently expandable between the silicate layers so that it swells when soaked in water to several times its dry volume. As will be shown, however, it appears that the effectiveness of montmorillonite clays in practicing the present invention, can be traced to neither the base exchange capacity nor the water-swelling character. It has been found, though, that clays of the other groups are essentially ineffective either in imparting hydrophilicity to or retaining that characteristic in polyurethane sponges. It is not known why the montmorillonite group of clays either impart hydrophilicity or remain attached to polyurethane foams with such extraordinary tenacity, resulting in the extremely long hydrophilic life of polyurethane sponges treated therewith.

DESCRIPTION OF PREFERRED EMBODIMENTS

As an aid to understanding the invention, without in any way limiting the scope thereof, the following illustrative examples are provided:

A conventional open-celled polyether polyurethane foam was prepared by blending the following.

| Components: | Parts by weight |
|---|---|
| Difunctional polypropylene glycol having a molecular weight of about 2000 (commercially available from Union Carbide Chemical Company under the trade designation "Niax" Polyol PPG2025) | 75.0 |
| Trifunctional polypropylene glycol, having a molecular weight of about 3000 (commercially available from Union Carbide Chemical Company under the trade designation "Niax" Polyol LG56) | 25.0 |
| Silicone surfactant cell size control agent (commercially available from Union Carbide Chemical Company under the trade designation L520) | 1.0 |
| Water | 2.9 |
| Triethylene diamine | 0.5 |
| Stannous octoate catalyst | 0.5 | and then adding 46 parts by weight of commercial 80/20 toluene 2,4-/2,6-diisocyanate. After vigorously stirring, the reactants were allowed to foam and cure for 24 hours, resulting in a polyurethane foam having a density of approximately 2 lbs. per cubic foot (0.03 gm./cc.), from which sponges approximately ¾ inch x 4 inches x 6 inches (2 x 10 x 15 cm.) were cut for further tests.

EXAMPLE 1

A slurry having a viscosity of approximately 1100 centipoises was prepared by dispersing 2 parts of bentonite in 98 parts of tap water. A sponge of the type previously described was completely immersed in the slurry, immediately removed, passed through a pair of ordinary rubber wringer rolls set as tight as possible, and dried at room temperature. (Complete drying is not essential, and in factory production it may prove more economical to package the treated sponges in slightly damp condition.) It was found that the sponge, which weighed about 20% more than when untreated, was extraordinarily hydrophilic, proving effective in picking up water from a damp surface across which it was wiped and sinking in less than 1 second when placed in a container of water. Under 70× magnification, the treated polyurethane sponge appeared less lustrous than an untreated sponge; at 350× small particles of bentonite could be seen on the surface.

EXAMPLE 2

Several open-celled polyether polyurethane foam sponges, dimensionally similar to that just described, but with a wide range of cell size and having a density of 1.2 lbs. per cubic foot (0.02 gm./cc.) (commercially available from Airtex Division of Fabric Supplies Company under the trade designation Multi-Celled polyurethane foam) were immersed in the 2% bentonite slurry and dried. Sponges of this material were used in subsequent examples herein. The water wicking ability of the treated commercial polyurethane sponge was determined, using a modified form of Interim Federal Specification L–P–0050a(GSA–FSS)

In accordance with this test the sponge was five times soaked in tap water and squeezed dry, and then weighed to the nearest centigram. Next it was placed for 15 seconds in a tray filled with cold tap water to ¼ the thickness of the sponge, removed, suspended in air for 30 seconds, and reweighed. The water retained was about 600–800% the original weight of the sponge, compared to 50% for an untreated polyurethane sponge and 300–500% for a cellulose sponge.

When placed in a tank of water, the treated polyurethane sponge sank considerably faster than a cellulose sponge, further indicating that the treated polyurethane sponge wets more rapidly than a cellulose sponge. When totally immersed in water, removed, and drained, both the treated polyurethane sponges and conventional cellulose sponges retain about 2500% their weight of water.

To determine the effective useful hydrophilic life of the sponges made in accordance with this example, a test was devised in which the treated sponges were immersed in tap water, passed through the set of wringer rolls previously described, and the cycle repeated for extended periods of time. The hydrophilic character of the sponges was checked periodically by wringing them dry and placing them in a container of water to see if they sank. The weight of bentonite remaining was determined by taking a sponge which had run a comparable number of cycles, burning off the organic material in a muffle furnace, and weighing the residue (compared to an untreated sponge) this weight was presumed to represent bentonite remaining. The following information was obtained:

| Cycles | Percent bentonite based on sponge weight) | Hydrophilic character |
|---|---|---|
| 0 | 16 | Hydrophilic. |
| 10 | 8 | Do. |
| 100 | 1.4 | Do. |
| 500 | 0.05 | Do. |
| 700 | 0.05 | Sponge barely sank; considered borderline. |

As a control, Example 2 was repeated, substituting 2% finely divided silica ("Cab-O-Sil" M–5, commercially available from Godfrey L. Cabot Company), dispersed in water adjusted to pH 1, after which the sponges were rinsed to remove the excess acid, all as described in U.S. Patent 3,224,899. It was found that the treated sponge was initially hydrophilic, having picked up approximately 4% silica, but that the average useful hydrophilic life of five samples, measured according to the test previously described, was only about 100 cycles.

When such other clays as kaolin, muscovite micromica, attapulgite, talc, or vermiculite are substituted for the bentonite, any hydrophilicity imparted lasts no more than perhaps 5–20 cycles.

Noting that half of the bentonite was lost in the first ten cycles, it was decided that a less concentrated slurry could be used. The next example shows that this is both practical and desirable.

EXAMPLE 3

Example 2 was repeated, employing a 0.2% bentonite slurry instead of the 2% slurry employed in Example 2. The initial bentonite pickup was somewhat less, but the useful hydrophilic life was approximately the same. When a 0.02% bentonite slurry was employed, the sponge was initially hydrophilic, but its useful hydrophilic life was only about 10 cycles.

EXAMPLE 4

Example 2 was repeated, employing a polyester polyurethane foam sponge (commercially available from American Urethane Company under the trade designation "Everlon" Ester F–1100) instead of the polyether urethane sponge. Results were essentially identical, although the somewhat higher cost of such sponge is not justified in most cases.

EXAMPLE 5

A barium-exchange bentonite as used hereinafter, was prepared by immersing bentonite in concentrated $BaNO_3$, stirring the resultant slurry overnight, allowing the clay to settle, decanting the supernatant liquid, and rinsing several times in clear water. The exchanged clay displayed drastically reduced swelling tendencies. When this clay was used in place of the bentonite of Example 2, a hydrophilic sponge was obtained, its useful hydrophilic life being over 1200 cycles. Calcium-exchanged bentonite has similarly been found extremely useful. Calcium- and barium-exchanged bentonites are hereinafter referred to as sub-bentonite.

Bentonite, which is readily available and consists predominantly of the montmorillonite species, is preferred for the practice of this invention. It has been found, however, that clay or other powdered material which contains a minor but significant amount of clay from the montmorillonite group is also effective, the degree of effectiveness being apparently directly related to the content of montmorillonite-group clay. The following example illustrates the use of such a blend.

EXAMPLE 6

Example 2 was repeated using a slurry containing a 10:90 bentonite:kaolin blend, representative of various impure clays which are commercially available. A hydrophilic sponge was obtained which had a useful hydrophilic life of approximately 400 cycles. When a slurry containing a 1:99 bentonite:koalin blend was used, the sponge absorbed water but failed to sink; its useful hydrophilic life was less than 10 cycles.

EXAMPLE 7

Hectorite was substituted for the bentonite employed in Example 2. The treated sponge was characterized by extremely rapid wetting, its useful hydrophilic life being approximately 500 cycles.

EXAMPLE 8

The hectorite of Example 7 was base-exchanged with aluminum by immersing it in a concentrated solution of aluminum nitrate, stirring vigorously overnight, allowing the clay to settle, decanting the supernatant liquid, and rinsing several times with distilled water. The thus-modified hectorite was substituted for the bentonite in Example 2. Again, a hydrophilic character was imparted to the sponge, the useful hydrophilic life being found to be 500 cycles.

EXAMPLE 9

A form of saponite having reduced water swellability (commercially available from R. T. Vanderbilt Company, Inc. under the trade designation "Neutral Veegum") was substituted for the bentonite employed in Example 2. A hydrophilic character was imparted to the sponge, and the useful hydrophilic life was 1200 cycles.

It is frankly not understood why other clays are not equally as effective as those of the montmorillonite group, which have been empirically discovered to impart long-lasting hydrophilic qualities to a normally hydrophobic polyurethane spong. Although it might be supposed that the water swelling characteristics of the montmorillonites account for their effectiveness, the foregoing examples seem to show that those having reduced swelling characteristics are superior. Interestingly, it has been found employing the montmorillonites as fillers or extenders for the polyurethane resin.

The hydrophilic life test described in connection with the foregoing examples is believed to provide an accurate means for predicting the life of a sponge under conditions of actual use. A hydrophilic life of 500 cycles, for example, is believed to show a sponge which would be worn out and discarded before losing its wettability in normal use. A hydrophilic life of 1000 cycles or more is believed to show a sponge which would retain its wettability even throughout a long life of extremely mild mechanical severity. It should be noted, however, that sponges whose wettability is reduced to an undesirably low level can quickly be rejuvenated by even an unskilled layman with no unusual equipment, following the teachings of the invention.

In practicing the invention, the man skilled in the art will adapt the procedure used to the specific manufacturing conditions, equipment, and raw materials employed. To illustrate, the concentration of montmorillonite clay should be sufficient to attain the beneficial results indicated, the upper limit being determined by such criteria as viscosity. In general, the useful concentration range lies between 0.2% and 5%, based on the total slurry weight, although slightly higher or lower values are sometimes effective.

It will also be apparent that the invention can be modified to incorporate such previously known technology as including detergent materials in the hydrophilic sponge, imparting a temporary utility for various cleaning operation.

If desired, polyurethane sponges may be laminated to other structures either before or after treatment in accordance with this invention. One especially useful cleaning product can be prepared by spotting drops of polyurethane adhesive on the face of the sponge and adhering it to one surface of a low density lofty fibrous web, especially one of the type described and claimed in Hoover et al. U.S. Patent 2,958,593; the resultant laminate is hydrophilic, and water flows easily through it. The sponge may also be adhered to a metal plate of the type used on a sponge mop head, replacing the conventionally employed cellulose sponge.

Although the primary utility for hydrophilic polyurethane sponges made in accordance with this invention has been disclosed as in the cleaning field, it will be appreciated that many other applications exist. For example, such sponges are particularly suitable as the carrier belt in humidifiers, moisture-absorbing interliners for clothing, furniture upholstery, etc.

What is claimed is:

1. A polyurethane sponge characterized by outstanding wetting and water absorption, even after prolonged and repeated use, said sponge having deposited on its surfaces powdered material containing clay from the montmorillonite group, the weight of said clay being at least about 0.05% the weight of said sponge.

2. The sponge of claim 1 wherein the clay from the montmorillonite group comprises bentonite.

3. The sponge of claim 1 wherein the clay from the montmorillonite group comprises a sub-bentonite having reduced swelling characteristics.

4. The sponge of claim 1 wherein the clay from the montmorillonite group comprises hectorite and the sponge is characterized by extremely rapid wetting.

5. The sponge of claim 1 wherein the clay from the montmorillonite group comprises saponite.

6. A simple and inexpensive method of making a polyurethane sponge characterized by outstanding wetting and water absorption, even after prolonged and repeated use, comprising the steps of preparing a fluent aqueous slurry containing an effective concentration of montmorillonite clay, in excess of 0.02% by weight, briefly immersing a polyurethane sponge in said slurry, and squeezing out the excess slurry.

7. The method of claim 6 wherein the montmorillonite clay concentration lies in the range of about 0.2% to about 5%.

References Cited

UNITED STATES PATENTS

| | | | |
|---|---|---|---|
| 2,920,983 | 1/1960 | Bugosh | 117—98 |
| 3,057,750 | 10/1962 | Bennett et al. | 117—98 |
| 3,094,433 | 6/1963 | Bugosh | 117—98 |
| 3,249,465 | 5/1966 | Chen | 117—98 |
| 3,353,994 | 11/1967 | Welsh. | |

DAVID KLEIN, Primary Examiner

U.S. Cl. X.R.

117—138.8